(12) United States Patent
Tiedge

(10) Patent No.: US 9,156,441 B2
(45) Date of Patent: *Oct. 13, 2015

(54) VEHICLE LEVELING SYSTEM AND METHOD

(71) Applicant: LIPPERT COMPONENTS, INC., Elkhart, IN (US)

(72) Inventor: Robert Tiedge, Cicero, IN (US)

(73) Assignee: LIPPERT COMPONENTS, INC., Elkhart, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/275,996

(22) Filed: May 13, 2014

(65) Prior Publication Data
US 2014/0246636 A1    Sep. 4, 2014

Related U.S. Application Data

(63) Continuation of application No. 13/007,158, filed on Jan. 14, 2011, now Pat. No. 8,757,637.

(60) Provisional application No. 61/294,896, filed on Jan. 14, 2010.

(51) Int. Cl.
*B60S 9/10* (2006.01)
*B60S 9/12* (2006.01)

(52) U.S. Cl.
CPC ..... *B60S 9/10* (2013.01); *B60S 9/12* (2013.01)

(58) Field of Classification Search
CPC .................. B60G 2800/20; B60G 2800/203; B60G 2800/204; B60G 17/04; B60S 9/10; B60S 9/12

USPC ............... 280/6.153–6.155, 406.2, 656, 789, 280/763.1–766.1, 124.16; 254/423
See application file for complete search history.

(56) References Cited

U.S. PATENT DOCUMENTS

| | | |
|---|---|---|
| 3,332,669 A | 7/1967 | Devys |
| 3,454,251 A | 7/1969 | Dye |
| 3,825,279 A | 7/1974 | Schmeichel |
| 3,857,582 A | 12/1974 | Hartog |
| 4,061,309 A | 12/1977 | Hanser |
| 4,216,939 A | 8/1980 | Valdespino |

(Continued)

FOREIGN PATENT DOCUMENTS

JP        58214446        12/1983

*Primary Examiner* — Laura Freedman
(74) *Attorney, Agent, or Firm* — Barnes & Thornburg LLP

(57) ABSTRACT

A system and method are disclosed for leveling a vehicle when stationary. The system includes three zones with a first zone at the front end, and the second and third zones on opposite sides of the vehicle. All zones include leveling jacks, each having a blind side and a rod side. At least one leveling jack is located in the first zone, and at least two leveling jacks are located in each of the second and third zones. The blind sides of the jacks in each zone are connected together. The rod sides of all of the jacks are connected to a common fluid line, which typically is at low fluid pressure or pressure-free. The method involves extending all of the jacks from retracted positions to extended positions until they meet the surface upon which the vehicle is located. Fluid is then applied to the blind sides of either the second or third zone leveling jacks to raise the lower of the two sides. If the front end is lower than the rear end, fluid is applied to the blind side of the leveling jack in the first zone. If the front end is higher than the rear, fluid is relived form the blind side of the leveling jack.

15 Claims, 4 Drawing Sheets

(56) References Cited

U.S. PATENT DOCUMENTS

| | | |
|---|---|---|
| 4,940,110 A | 7/1990 | Svensson et al. |
| 5,176,391 A | 1/1993 | Schneider et al. |
| 5,727,767 A | 3/1998 | Jefrey |
| 6,142,488 A | 11/2000 | Orr |
| 8,690,128 B1 * | 4/2014 | Schwindaman et al. ...... 254/423 |
| 8,757,637 B2 * | 6/2014 | Tiedge ....................... 280/6.153 |
| 8,840,144 B2 * | 9/2014 | Armstrong et al. ........ 280/765.1 |
| 2011/0024706 A1 | 2/2011 | Schwindaman et al. |

* cited by examiner

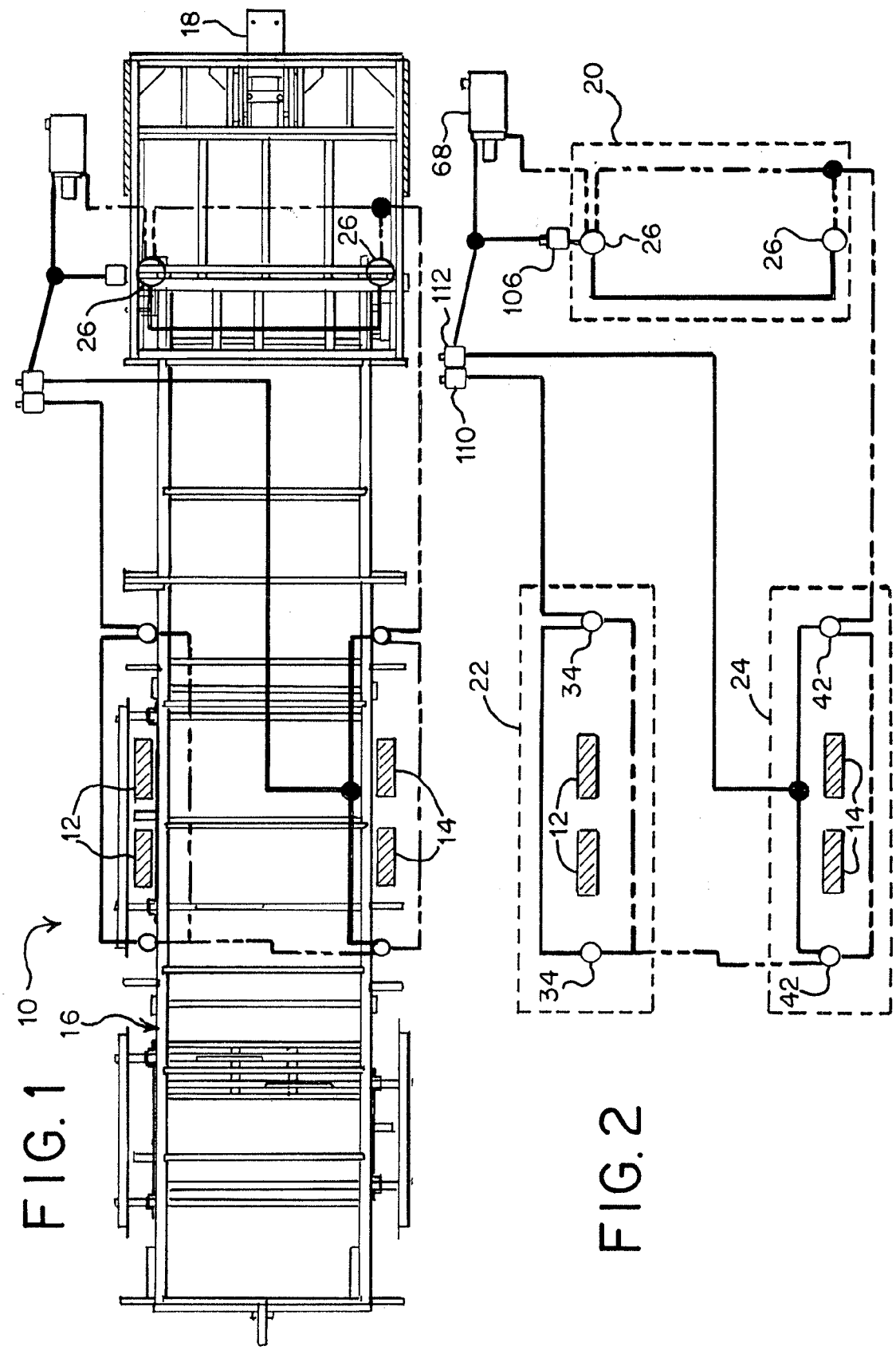

FIG. 4

| SEQUENCE OF OPERATION | MOTOR ROTATION EXTEND | MOTOR ROTATION RETRACT | SOLENOID S1 | SOLENOID S2 | SOLENOID S3 |
|---|---|---|---|---|---|
| ARRIVING AT CAMP SITE | | | | | |
| BACK INTO CAMP SITE WITH ALL JACKS UP | | | | | |
| EXTEND LANDING GEAR TO DISCONNECT FROM TRUCK | ⇨ | | | | |
| PULL TRUCK OUT | | | | | |
| EXTEND OR RETRACT LANDING GEAR TO LEVEL FRONT TO BACK | ⇨ | ⇦ | | | ☆ |
| EXTEND ROAD SIDE JACKS UNTIL THEY TOUCH THE GROUND | ⇨ | | ☆ | | ☆ |
| EXTEND DOOR SIDE JACKS UNTIL THEY TOUCH THE GROUND | ⇨ | | | ☆ | |
| EXTEND ROAD SIDE OR DOOR SIDE JACKS TO LEVEL UNIT SIDE TO SIDE | ⇨ | ⇦ | ☆ | ☆ | ☆ |
| EXTEND OR RETRACT LANDING GEAR TO LEVEL FRONT TO BACK | | | | | |
| DEPARTING CAMP SITE | | | | | |
| EXTEND OR RETRACT LANDING GEAR TO CONNECT TO TRUCK | | | | | ☆ |
| CONNECT TO TRUCK | | | | | |
| RETRACT ROAD SIDE JACKS FULLY | | ⇦ | ☆ | | |
| RETRACT DOOR SIDE JACKS FULLY | | ⇦ | | ☆ | |
| RETRACT LANDING GEAR FULLY | | ⇦ | | | ☆ |

VEHICLE LEVELING SYSTEM AND METHOD

CROSS-REFERENCE TO RELATED APPLICATIONS

This application is a continuation of U.S. patent application Ser. No. 13/007,158, filed on Jan. 14, 2011, which claims benefit of the filing date of U.S. Provisional Patent Application No. 61/294,896, filed Jan. 14, 2010, the disclosures of which are incorporated by reference herein in their entireties.

BACKGROUND OF THE INVENTION

This invention relates to leveling of vehicles, and in particular to leveling of a vehicle, such as a recreational vehicle, when the vehicle is in a stationary location in order to stabilize the vehicle in a particular orientation.

Recreational vehicles are typically transportable from one location to another. There are many different types of recreational vehicles, including self-contained vehicles that include an engine and driver's location, and vehicles that are towed behind a powered vehicle. In the latter case, towed vehicles are typically either attached to a bumper hitch, or attached to a bed hitch, with the latter being known as a fifth wheel vehicle.

No matter the type of the recreational vehicle, when the vehicle is parked and to be used in a stationary location, preferably the vehicle is stabilized so that it is not subject to the bounce and sway as it is being used. To this end, many types of leveling and stabilizing can be used, and the present invention is directed to leveling and stabilizing by means of extendable leveling jacks.

Leveling jacks are of three basic configurations. The first is a manually-operated jack, where the user extends or retracts the jack by means of a hand crank or the like. The second is an electrically-actuated jack, where the user employs an electric pump to extend or retract the jack. The third is a hydraulic jack, where fluid pressure from a hydraulic pump is used to extend or raise a jack.

SUMMARY OF THE INVENTION

The invention is directed to a system for leveling a vehicle when stationary, where the vehicle includes a front end and opposite sides, with at least one wheel proximate one side and at least one wheel proximate an opposite side. The system comprises three leveling zones, with a first zone located near the front end, a second zone at the one side and a third zone at the opposite side. The first zone comprises at least one first zone leveling jack having a blind side and a rod side. The second zone comprises at least two second zone leveling jacks, each second zone leveling jack having a blind side and a rod side, with one of the second zone leveling jacks being fore of the wheel on the one side and another of the second zone leveling jacks being aft of the wheel on the one side, and with the blind sides of the second zone leveling jacks being connected to one another for equalizing fluid pressure therein. The third zone comprises at least two third zone leveling jacks, each third zone leveling jack having a blind side and a rod side, with one of the third zone leveling jacks being fore of the wheel on the opposite side and another of the third zone leveling jacks being aft of the wheel on the opposite side, and with the blind sides of the third zone leveling jacks being connected to one another for equalizing fluid pressure therein. The rod sides of all leveling jacks are connected to a common fluid line.

In accordance with the preferred form of the invention, the system includes two of the first zone leveling jacks, one first zone leveling jack being proximate each of the sides of the vehicle, and the blind sides of the first zone leveling jacks are connected to one another for equalizing fluid pressure therein.

Preferably, the common fluid line is connected to a hydraulic power supply. For supplying fluid to the leveling jacks, the hydraulic power supply includes a hydraulic pump and a fluid reservoir.

The system includes a first valve for supplying fluid to the blind side of the first zone leveling jack, a second valve for supplying fluid to the blind sides of the second zone leveling jacks, and a third valve for supplying fluid to the blind sides of the third zone leveling jacks. Each valve is a multi position hydraulic valve having a connection position and a blocked position. Normally, each valve is in the blocked position until activated.

In the preferred form of the invention, the jacks are hydraulic. Electric jacks can also be used, as well pneumatic jacks.

In the method according to the invention, first all of the leveling jacks are extended from a retracted position to an extended position meeting the surface on which the vehicle is located. Then, fluid is applied to the blind sides of one of the second and third zone leveling jacks in order to raise or lower one of the sides. Then, if the front end is higher than the back, fluid to the blind side of the first zone leveling jack is reduced in order to lower the front end, while if the front end is lower than the back, fluid to the blind side of the first zone leveling jack is increased to raise the front end.

In accordance with one form of the invention, for a towed vehicle, after all of the leveling jacks are extended from the retracted position to an extended position meeting the surface on which the vehicle is located, fluid is first applied to the blind side of the first zone leveling jack in order to raise the front end of the vehicle to a desired first position. This permits the towing vehicle to be disconnected and removed, and then the leveling method proceeds.

BRIEF DESCRIPTION OF THE DRAWINGS

The invention is described in greater detail in the following description of examples embodying the best mode of the invention, taken in conjunction with the drawing figures, in which:

FIG. 1 is a top plan view of the frame of a recreational vehicle employing the leveling system according to the invention, FIG. 2 is a view similar to FIG. 1, but without the frame, in order to better depict the elements of the invention and the zones in which the leveling jacks are located, FIG. 4 depicts the various steps of use of the invention in connection with a fifth wheel vehicle.

DETAILED DESCRIPTION OF THE DRAWINGS

Figure 3:
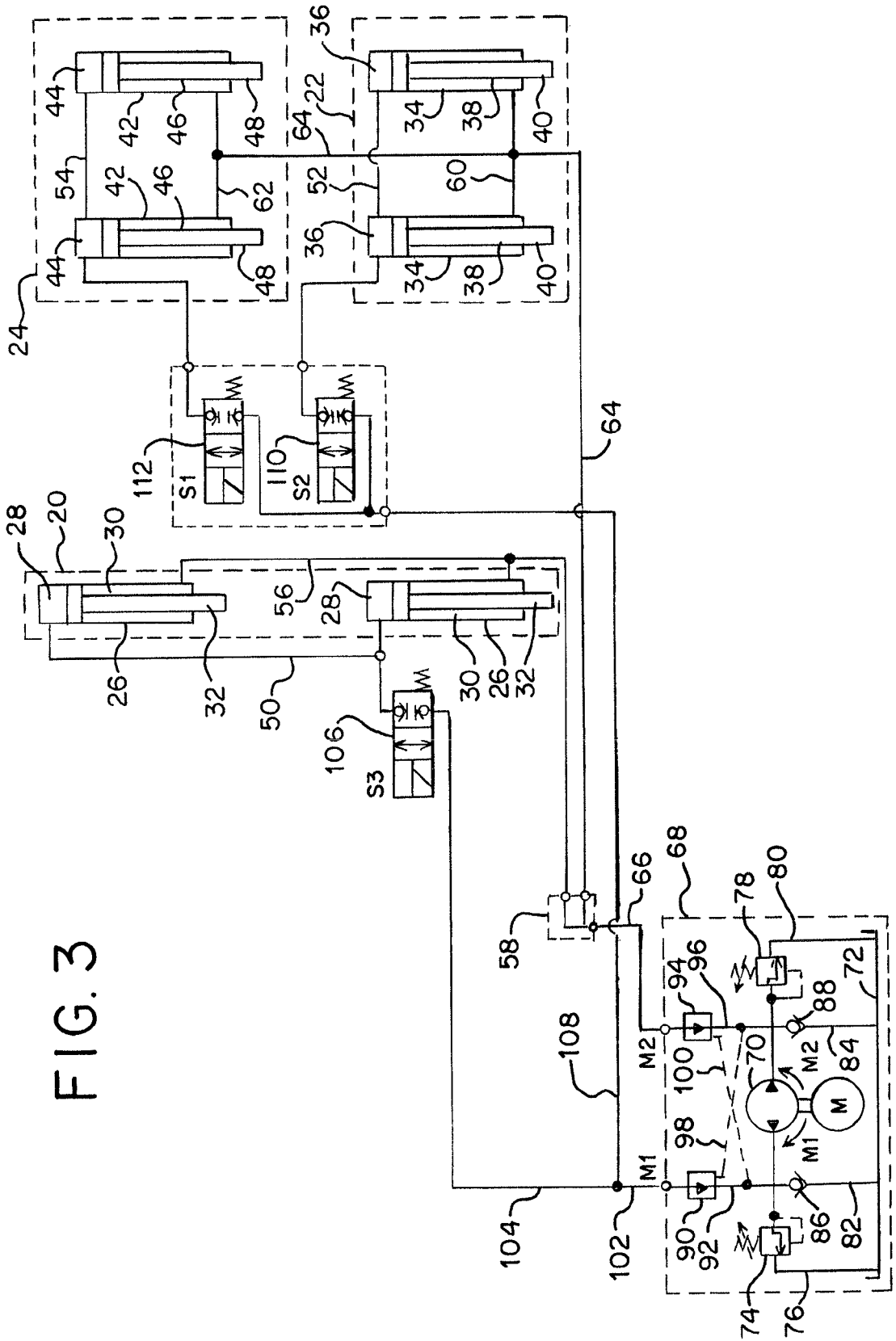
FIG. 3 shows the elements of the system according to the invention, with electric wiring omitted for purposes of clarity.
Figure 5:
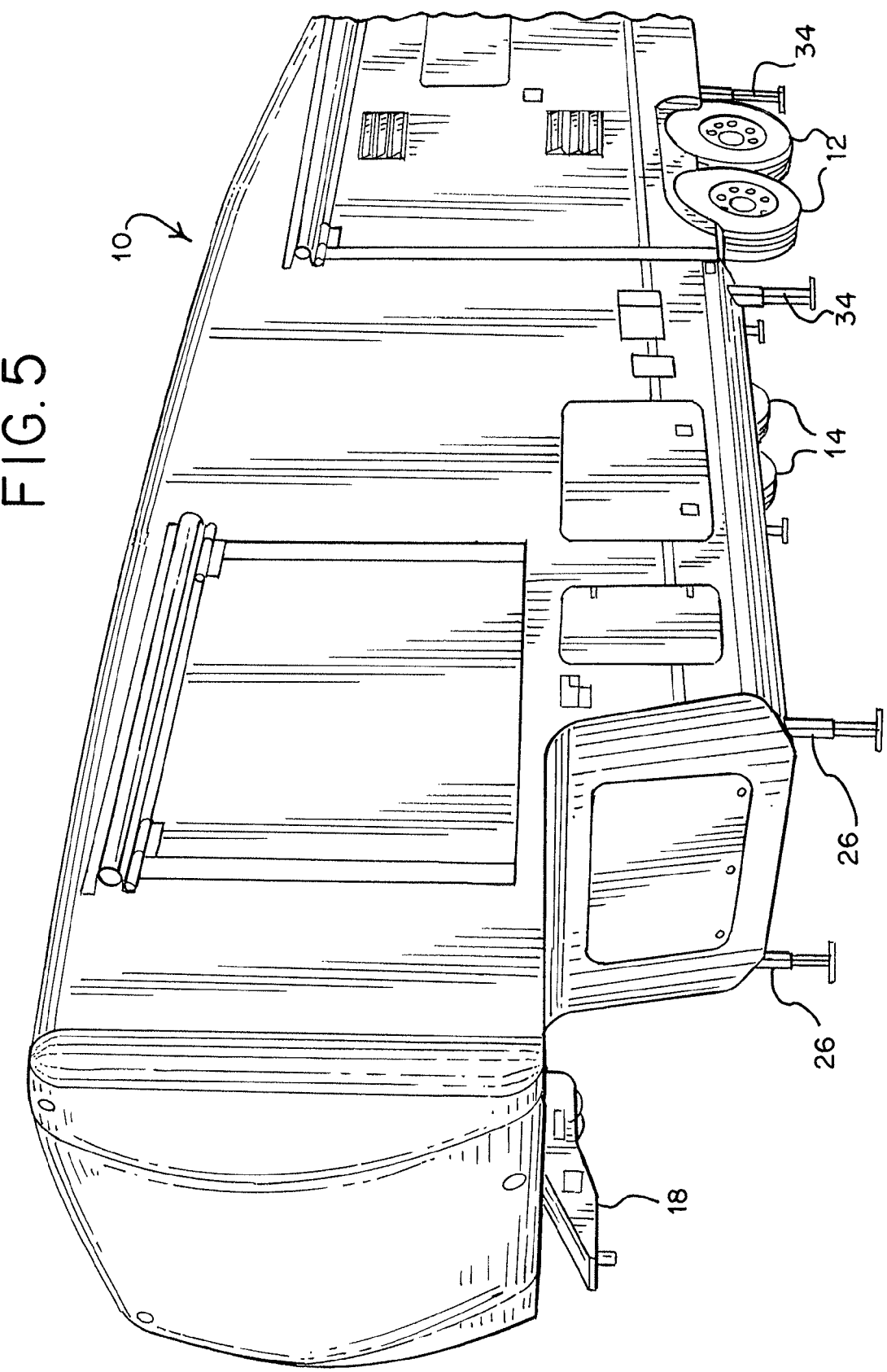
FIG. 5 is a front perspective view of a vehicle employing the leveling system according to the invention.

The invention is described in relation to its use in leveling a recreational vehicle. While the term "leveling" normally means placing the vehicle at a level orientation, it can also mean placing the vehicle at any attitude desired by the user, which could be level, or at an inclination desired by the user, whether fore-to-aft, side-to-side, or both. Thus, the term "level" as used herein means both a level orientation, or an orientation, non-level, desired by the user.

For ease of description, the invention is described in relation to its use in connection with a fifth wheel recreational vehicle. However, the invention can be used with any kind of towed vehicle, or a motorized vehicle. Furthermore, while the invention is preferred to be used in connection with a recreational vehicle, it can also be used in connection with leveling of just about any vehicle, towed or not, where leveling and stabilization are required.

The invention is shown in the drawing figures when used in connection with a fifth wheel type of recreational vehicle 10. This type of recreational vehicle, as is well known to those skilled in the art, is a vehicle supported on opposite wheels 12 and 14, as depicted being pairs of wheels supporting a frame 16 upon which the recreational vehicle 10 is built. A hitch 18, extending from the frame 16, is used for connection to a towing vehicle (not illustrated) for transporting the recreational vehicle 10 from one location to another. All of this is well known to those skilled in the art, and therefore the nature of the recreational vehicle 10 will not be described in further detail.

Simply for the sake of description, the wheels 12 are on the side of the recreational vehicle 10 known as the driver's side or the road side. Similarly, the wheels 14 are located on what is known as the door side. This terminology is used for ease of description, and is used throughout, but is not intended to in any way limit the nature of the invention.

The system according to the invention comprises three leveling zones, a first zone 20 located near the front of the vehicle 10, a second zone 22 located on the road side of the vehicle 10 and a third zone 24 located on the door side of the vehicle 10.

Each of the leveling zones 20, 22 and 24 includes leveling jacks, as described in greater detail immediately below. The leveling jacks may be of any appropriate type, with those of pending U.S. patent application Ser. No. 12/683,335, filed Jan. 6, 2010 and Ser. No. 12/355,320, filed Jan. 16, 2009, the disclosures of which are incorporated herein by reference, being types of jacks that can be employed. For simplicity, the jacks are schematically illustrated in the drawing figures, and each jack includes a blind side, to which hydraulic fluid is applied for extending a rod, and a rod side, which includes a rod that is extended for leveling purposes. All of this is well known to those skilled in hydraulics.

In the first zone 20, there is at least one leveling jack. Preferably, for stability, there are two leveling jacks 26, as illustrated. Each of the leveling jacks 26 includes a blind side 28 and a rod side 30. The leveling jacks 26 are located on opposite sides of the frame 16, as best illustrated in FIG. 1. The jacks 26 are appropriately secured to the frame 16, and include a rod 32 extending therefrom for leveling purposes.

The second zone 22 includes a pair of leveling jacks 34 located on opposite sides of the wheels 12. One of the leveling jacks 34 is fore (toward the front of the vehicle 10), and the other of the leveling jacks 34 is aft (toward the rear of the vehicle 10). Similar to the leveling jacks 26, the leveling jacks 34 each include a blind side 36, a rod side 38, and rods 40 which extend for leveling purposes. Similar to the first zone 20, the leveling jacks 34 are appropriately secured to the frame 16.

The third zone 24 is similar to the second zone 22. The third zone 24 includes a pair of leveling jacks 42, one fore of the wheels 14 and one aft of the wheels 14. Each of the leveling jacks 42 includes a blind side 44, a rod side 46 and a rod 38 extending therefrom. The leveling jacks 34 are appropriately secured to the frame 16.

The blind sides 28 of the leveling jacks 26 are connected to one another for equalizing fluid pressure therein by means of a fluid line 50. Similarly, the blind sides 36 of the leveling jacks 34 are connected to one another for equalizing fluid pressure by means of a fluid line 52. Finally, the blind sides 44 of the leveling jacks 42 are connected to one another by a fluid line 54. Thus, for each of the zones 20, 22 and 24, the blind sides of the leveling jacks are connected to one another for experiencing the same fluid pressure on the blind side of their respective pair of jacks.

The rod sides of the leveling jacks 26 are connected to a common fluid line 56, leading to a community block 58. The rod sides of the leveling jacks 34 are connected to a common fluid line 60 and the rod sides of the leveling jacks 42 are connected to a fluid line 62. The fluid lines 60 and 62 are connected to a fluid line 64 leading to the community block 58, at which all of the lines are joined to a fluid line 66 leading to a hydraulic power supply 68.

The hydraulic power supply 68 includes a hydraulic pump 70 and a fluid reservoir 72. As illustrated, the hydraulic pump 70 is operated in two directions, identified by the arrows M1 and M2.

On one side of the pump a pressure relief valve 74 is in a line 76 leading to the fluid reservoir 72. For the purposes of further description, this will be known as the M1 side of the pump 70.

Similarly, on the other, or M2, side of the pump 70, a pressure relief valve 78 is located in a line 80 leading to the fluid reservoir 72. The fluid pressure valves 74 and 78 are adjustable, as shown. Lines 82 and 84 also are connected to the fluid reservoir 72. A low pressure check valve 86 is located in the line 82 and a low pressure check valve 88 is located in the line 84.

On the M1 side of the pump 70, a cross over check valve 90 is located in a line 92. On the M2 side of the pump 70, a cross over check valve 94 is located in a line 96 leading to the fluid line 66. A cross over check line 98 leads from the cross over check valve 90 to the line 96, and a cross over check line 100 leads from the cross over check valve 94 to the line 92.

A fluid line 102 leads from the line 92, and is split into a fluid line 104 leading to a double blocking valve 106 and a fluid line 108 leading to double blocking valves 110 and 112. As illustrated, the fluid valves 106, 110 and 112 are multi position valves, each having a connection position and a blocked position. Each of the fluid valves 106, 110 and 112 is normally biased at rest to the blocked position shown in FIG. 3, but when activated, moves to the connection position shown adjacent the blocked position.

For applying fluid pressure to the blind sides 28 of the leveling jacks 26 of the first zone 20, the pump 70 is operated in the M1 direction, applying fluid pressure to the fluid line 102 and thence through the fluid line 104 to the fluid valve 106. The fluid valve 106 is activated to slide to the connection position, and fluid is therefore transmitted through the line 50 to the jacks 26.

Application of fluid to the blind sides 36 and 44 of the respective leveling jacks 34 and 42 is similar. With the pump 70 operated in the M1 direction, fluid is applied through the fluid line 102 and thence through the fluid line 108 to the fluid valves 110 and 112. Sliding the fluid valve 110 to the connection position applies fluid to the blind sides 36 of the leveling jacks 34, while sliding the fluid valve 112 to the connection position applies fluid to the blind sides 44 of the leveling jacks 42.

When the pump 70 is operated in the M1 direction, the line 66 is fluid free. However, when the pump 70 is operated in the M2 direction, fluid is applied via the line 66 through the community block 58 to the rod sides of all of the leveling jacks 26, 34 and 42, while fluid is withdrawn from the line 102. That, then, allows withdrawing of fluid on the blind sides of the jacks 26, 34 and 42 by activation of their respective fluid valves 106, 110 and 112.

FIG. 4 sets forth a typical sequence of operation of the invention when used in connection with a towed recreational vehicle. As illustrated, in the pump rotation with arrows pointed downwardly, that is the M1 direction, and the opposite is the M2 direction. The stars indicate activation of the solenoid operating the respective fluid valves 112, 110 and 106.

In order to disconnect the recreational vehicle from its towing vehicle, in this instance a truck, first the leveling jacks 26 of the first zone 20 are activated, extending the leveling jacks, also known, in this location, as the landing gear. The vehicle is then disconnected and withdrawn, and the leveling begins. First, if needed, the leveling jacks 26 are raised or lowered to level the vehicle 10 from front to rear. Then, the jacks 34 and 42 are extended until the ground or other surface is encountered. That is by means of the respective solenoids S2 of the fluid valve 110 and S1 of the fluid valve 112. Then, depending on the attitude of the vehicle 10 from side to side, it is leveled by extending the lower of the jacks 34 and 42 until the desired level is achieved. Thereafter, the jacks 26 are extended or retracted until the vehicle 10 is at the desired level from front to rear.

To prepare the vehicle 10 for movement to another site, first the vehicle 10 is connected to the towing vehicle in a conventional manner by raising or lowering the leveling jacks 26 to present the hitch 18 at a proper height to the towing vehicle. After connection, the fluid valve 110 is activated by the solenoid S2 with the pump rotating in the M2 direction in order to retract the jacks 34. Then, similarly, the solenoid S1 activates the fluid valve 112 to allow retraction of the jacks 42. Then, finally, the jacks 26 are raised. Obviously, the order of raising the jacks 38 and 42 is arbitrary, and can be reversed.

The invention provides a unique system and method for leveling of vehicles when stationary to achieve a stable position. Various changes can be made to the invention without departing from the spirit thereof or scope of the following claims.

What is claimed is:

1. A system for leveling a vehicle when stationary, where the vehicle includes a front end and first and second opposite sides, the system comprising
   a. three leveling zones, with a first zone located near the front end, a second zone on the first side and a third zone on the second side,
   b. the first zone comprising at least one first zone leveling jack having a blind side and a rod side,
   c. the second zone comprising at least two second zone leveling jacks, each second zone leveling jack having a blind side and a rod side, and
   d. the third zone comprising at least two third zone leveling jacks, each third zone leveling jack having a blind side and a rod side,
   e. the blind sides of said second zone leveling jacks being connected to one another for equalizing fluid pressure therein, the second zone further comprising a second zone isolation valve operable to selectively isolate said blind sides of said second zone leveling jacks from said blind side of said first zone leveling jack and said blind sides of said third zone leveling jacks while simultaneously allowing equalizing of fluid pressure among said blind sides of said second zone leveling jacks, and
   f. the blind sides of said third zone leveling jacks being connected to one another for equalizing fluid pressure therein, the third zone further comprising a third zone isolation valve operable to selectively isolate said blind sides of said third zone leveling jacks from said blind side of said first zone leveling jack and said blind sides of said second zone leveling jacks while simultaneously allowing equalizing of fluid pressure among said blind sides of said third zone leveling jacks.

2. The system for leveling a vehicle according to claim 1, said first zone comprising two first zone leveling jacks, each first zone leveling jack having a blind side and a rod side, one of said first zone leveling jacks being proximate said first side and the other of said first zone leveling jacks being proximate said second side, and the blind sides of said first zone leveling jacks being connected to one another for equalizing fluid pressure therein.

3. The system for leveling a vehicle according to claim 1, in which the rod sides of all of said leveling jacks are connected to a common fluid line.

4. The system for leveling a vehicle according to claim 1, in which each valve is a multi-position hydraulic valve having a connection position and a blocked position.

5. The system for leveling a vehicle according to claim 4, further comprising a hydraulic pump in fluid communication with said blind sides of said second zone leveling jacks when said second zone hydraulic valve is in said connection position and in fluid communication with said blind sides of said third zone leveling jacks when said third zone hydraulic valve is in said connection position.

6. The system for leveling a vehicle according to claim 1, further comprising a first zone isolation valve operable to selectively isolate said blind side(s) of said at least one first zone leveling jack from said blind sides of said second zone leveling jack and said blind sides of said third zone leveling jacks.

7. The system for leveling a vehicle according to claim 6, in which each valve is normally in the blocked position.

8. A system for leveling a vehicle when stationary, where the vehicle includes a front end and opposite sides, the system comprising:
   a. three leveling zones, with a first zone located near the front end, a second zone at the one side and a third zone at the opposite side;
   b. the first zone comprising a pair of first zone hydraulic leveling jacks each having a blind side and a rod side,
   c. the second zone comprising at least two second zone hydraulic leveling jacks each having a blind side and a rod side, and
   d. the third zone comprising at least two third zone hydraulic leveling jacks each having a blind side and rod side,
   e. the blind sides of the first zone leveling jacks, the second zone leveling jacks, and third zone leveling jacks connected to one another,
   f. the first zone further comprising a first zone isolation valve operable to selectively isolate said blind sides of said first zone leveling jacks from said blind sides of said second zone leveling jacks and said blind sides of said third zone leveling jacks while simultaneously allowing equalizing of fluid pressure among said first zone leveling jacks;
   g. the second zone further comprising a second zone isolation valve operable to selectively isolate said blind sides of said second zone leveling jacks from said blind sides of said first zone leveling jacks and said blind sides of said third zone leveling jacks while simultaneously allowing equalizing of fluid pressure among said second zone leveling jacks; and
   h. the third zone further comprising a third zone isolation valve operable to selectively isolate said blind sides of said third zone leveling jacks from said blind sides of said first zone leveling jacks and said blind sides of said second zone leveling jacks while simultaneously allowing equalizing of fluid pressure among said third zone leveling jacks.

9. The system for leveling a vehicle according to claim 8, in which said rod sides of all of said leveling jacks are connected to a common fluid reservoir.

10. The system for leveling a vehicle according to claim 9, including a hydraulic power supply, said power supply including a hydraulic pump and said common reservoir.

11. The system for leveling a vehicle according to claim 10, in which each of said isolation valves is a multi-position hydraulic valve having a connection position and a blocked position.

12. The system for leveling a vehicle according to claim 11, wherein said hydraulic pump is in fluid communication with said blinds sides of said first zone leveling jacks when said first zone isolation valve is in said connection position, said hydraulic pump is in fluid communication with said blinds sides of said second zone leveling jacks when said second zone isolation valve is in said connection position, and said hydraulic pump is in fluid communication with said blinds sides of said third zone leveling jacks when said third zone isolation valve is in said connection position.

13. The system for leveling a vehicle according to claim 12, in which each of said isolation valves is normally in the blocked position.

14. A method for leveling a vehicle when stationary on a surface, where the vehicle includes a front end, a rear end and first and second opposite sides, and leveling zones comprising a first zone located near the front end and including a hydraulic first zone leveling jack having a blind side and a rod side, a second zone on the first side and including two hydraulic second zone leveling jacks each having a blind side and a rod side with the blind sides of said second zone leveling jacks being connected to one another for equalizing fluid pressure therein, and a third zone on the second side and including two hydraulic third zone leveling jacks each having a blind side and a rod side with the blind sides of said third zone leveling jacks being connected to one another for equalizing fluid pressure therein, the second zone further including a second zone isolation valve operable to selectively isolate said blind sides of said second zone leveling jacks from said blind side of said first zone leveling jack and said blind sides of said third zone leveling jacks while simultaneously allowing equalization of fluid pressure among said blind sides of said second zone leveling jacks, the third zone further including a third zone isolation valve operable to selectively isolate said blind sides of said third zone leveling jacks from said blind side of said first zone leveling jack and said blind sides of said second zone leveling jacks while simultaneously allowing equalization of fluid pressure among said blind sides of said third zone leveling jacks, and each of said jacks having a rod extendable and retractable from said rod side thereof, the method comprising the steps of:
  a. extending said rods of all of said leveling jacks from a retracted position to an extended position meeting the surface,
  b. applying fluid to the blind side of at least one of said second and third zone leveling jacks to raise a corresponding at least one of said first and second sides, and
  c. if said front end is higher than said rear end, withdrawing fluid from the blind side of said first zone leveling jack,
  d. if said front end is lower than said rear end, applying fluid to the blind side of said first zone leveling jack.

15. The method according to claim 14, including the step, before step b, of applying fluid to the blind side of said first zone leveling jack to raise the front end to a desired first position.

\* \* \* \* \*